US009156011B2

(12) United States Patent
Unteregger et al.

(10) Patent No.: US 9,156,011 B2
(45) Date of Patent: Oct. 13, 2015

(54) BLENDER SYSTEM HAVING FIRST AND SECOND VORTICES FOR IMPROVED MATERIAL EXCHANGE

(75) Inventors: Johann Unteregger, Klagenfurt (AT); Juergen Holzbauer, Maria Rain (AT); Nikolas Fahlskog, Krumpendorf (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1182 days.

(21) Appl. No.: 12/993,479

(22) PCT Filed: May 25, 2009

(86) PCT No.: PCT/IB2009/052172

§ 371 (c)(1), (2), (4) Date: Nov. 19, 2010

(87) PCT Pub. No.: WO2009/144651

PCT Pub. Date: Dec. 3, 2009

(65) Prior Publication Data

US 2011/0063944 A1 Mar. 17, 2011

(30) Foreign Application Priority Data

May 30, 2008 (EP) .................................... 08157261

(51) Int. Cl.

| | |
|---|---|
| ***A47J 43/046*** | (2006.01) |
| ***B01F 7/00*** | (2006.01) |
| ***B01F 7/16*** | (2006.01) |
| ***B01F 15/00*** | (2006.01) |

(52) U.S. Cl.

CPC ............ *B01F 7/00975* (2013.01); *B01F 7/162* (2013.01); *B01F 7/163* (2013.01); *B01F 7/167* (2013.01); *B01F 7/169* (2013.01); *B01F 7/1665* (2013.01); *B01F 15/00824* (2013.01); *B01F 15/00909* (2013.01)

(58) Field of Classification Search

CPC ............................ A47J 43/046; A47J 43/0716

USPC ............ 366/197–206, 314, 297–300; 99/348; 241/282.1–282.2

See application file for complete search history.

(56) References Cited

U.S. PATENT DOCUMENTS

| | | | | |
|---|---|---|---|---|
| 3,342,425 A * | 9/1967 | Morton | ...................... | 241/46.17 |
| 3,345,043 A * | 10/1967 | Bovagne | ........................ | 366/314 |
| 3,722,831 A * | 3/1973 | Bialas et al. | .................. | 366/291 |
| 4,033,517 A * | 7/1977 | Weiss | ......................... | 241/46.11 |
| 4,256,407 A * | 3/1981 | Seiderman | ..................... | 366/300 |
| 4,911,557 A * | 3/1990 | Dormer et al. | ................ | 366/299 |
| 5,323,973 A * | 6/1994 | Ferrara, Jr. | ................... | 241/37.5 |

(Continued)

FOREIGN PATENT DOCUMENTS

| | | |
|---|---|---|
| CH | 382130 A | 9/1964 |
| DE | 374882 C | 5/1923 |

(Continued)

*Primary Examiner* — Charles Cooley

(57) ABSTRACT

A blender system (1) has a container (3) for holding material to be blended. The container (3) has a first portion (2) with blade member assemblies (6, 8). The assemblies (6, 8) are rotationally driveable around axes of rotation (10, 12). The container has a second portion (4) with a guiding surface (18). A cross-section (38) of the guiding surface (18) which encloses said axes of rotation is a convexly shaped closed curve (20). The direction of the cross-sectional curve (20) is continuously varying direction along the perimeter of the guiding surface (18).

10 Claims, 16 Drawing Sheets

(56) References Cited

U.S. PATENT DOCUMENTS

| | | | | |
|---|---|---|---|---|
| 6,981,795 | B2 * | 1/2006 | Nikkah | 366/199 |
| 8,556,203 | B2 * | 10/2013 | Unteregger et al. | 241/282.1 |
| 2005/0018534 | A1 * | 1/2005 | Nikkah | 366/205 |
| 2009/0161482 | A1 * | 6/2009 | Sandford | 366/192 |
| 2011/0063944 | A1 * | 3/2011 | Unteregger et al. | 366/297 |
| 2011/0101138 | A1 * | 5/2011 | Unteregger et al. | 241/36 |
| 2012/0314533 | A1 * | 12/2012 | Wang | 366/292 |

FOREIGN PATENT DOCUMENTS

| | | | |
|---|---|---|---|
| DE | 417549 | C | 1/1925 |
| DE | 1160801 | | 1/1964 |
| DE | 1782115 | A1 | 7/1970 |
| DE | 4223612 | A1 | 1/1994 |

* cited by examiner

C - C

BLENDER SYSTEM HAVING FIRST AND SECOND VORTICES FOR IMPROVED MATERIAL EXCHANGE

FIELD OF THE INVENTION

The invention relates to a blender system having a container for holding material to be blended, the container having a first portion accommodating two or more blade member assemblies for blending said material, wherein the said assemblies are rotationally driveable around respective axes of rotation, and a second portion for maintaining and guiding a flow of said material through the first portion and along said assemblies, wherein the second portion has a guiding surface for guiding the flow.

BACKGROUND OF THE INVENTION

A noted deficiency in prior art culinary mixers is a tendency for so-called bridging, i.e. the effect that as food is added to a container of the mixer and as agitator blades of the mixer are rotated, there is a strong tendency for the product inside the container which is in close proximity to the rotating blades to become liquefied while preventing unprocessed material to be transported to the rotating blades to become disintegrated or blended. It is as if a bridge is formed between the rotating blades and the unprocessed product by a liquefied zone of disintegrated product.

Patent publication U.S. Pat. No. 4,256,407 discloses a mixer in an arrangement to overcome the bridging effect. The mixer of U.S. Pat. No. 4,256,407 is comprised of a container having two lobes. The container is fitted with a cover and in operative communication with a base having a motor. The container is fabricated by joining two partial cylinders along the arcs thereof. The lobes form semi-independent agitation zones, each provided with a rotatable blender blade therein. As the blades rotate, the semi-independent agitation zones are established within the lobes such that a material flow is established from top to bottom.

However, a bridging effect may still be initiated when difficult food products such as meats and products of high viscosity are processed.

SUMMARY OF THE INVENTION

It is an object of the invention to provide a blender system of the kind set forth in the opening paragraph which further improves the uniformity of the product obtained by the blending process.

According to the invention this object is realised in that a cross-section of the guiding surface which encloses said axes of rotation is a convexly shaped closed curve having a tangent of a continuously varying direction along its perimeter for maintaining the flow along said perimeter.

As the product is agitated by the blade members, the product around each blade member is brought into a flow pattern which may be characterised as a vortex. A vortex is a spinning, often turbulent, flow of fluid or liquefied product around a centre line or centre curve. The motion of the fluid or liquefied product or material to be blended swirling rapidly around the centre line or centre curve is called vortex motion. The speed and rate of rotation of the fluid are greatest at the centre curve, also called vortex core, and decrease progressively with distance from the vortex core.

The axes of rotation of the blade members determine the orientation of the vortex cores and hence of the vortices which are induced by each of the rotating blade members. Particles in the vortex are circulating around the vortex core. To reduce or avoid bridging it is very advantageous if particles from one vortex can be transported to another vortex and vice versa. As the cross-section of the guiding surface encloses the axes of rotation, the cross-section also encloses the vortex cores of the corresponding vortices which are induced by each of the rotating blade members. The cross-section of the guiding surface is a convexly shaped closed curve. Hence, every pair of points lying within the closed curve formed by the cross-section of the guiding surface can be connected by a straight line segment and every point on the straight line segment joining the pair of points is also positioned within the closed curve. If a pair of points within the convexly shaped curve is considered which pair has a first point in a first vortex and a second point in a second vortex adjacent to the first vortex, than the first and second point can be connected by a straight line segment of which segment a first end is located in the first vortex and a second end is located in the second vortex. All points between the first point and the second point which are located on the straight line segment are either in the first vortex or in the second vortex. As the curve is convexly shaped the straight line cannot cross the guiding surface. Hence it is always possible—independent of the position of the first and second point inside the convexly shaped curve—that a particle in the first vortex is transported into the adjacent second vortex via a straight line, i.e. via a shortest distance, without being hindered by the guiding surface. The convexly shaped curve is a feature which establishes minimal resistance to exchange of product from the first vortex to the second vortex and vice versa. The resistance to exchange being minimal contributes to the prevention of bridging effects or further reduces the time which is needed to overcome any bridging effect if established. Even if the first and second vortices are not adjacent to each other, exchange of material between the said first and second vortices is still possible via a straight line which line originates in the first vortex and ends in the second vortex, without crossing the guiding surface, the cross-section of the guiding surface being a convexly shaped closed curve.

At increasing distance from the vortex core, i.e. towards the guiding surface of the second portion, the speed of the product decreases and remote from the vortex core the product is carried or guided along said guiding surface at a speed which is relatively low compared to the speed near the vortex core. Hence the product which is carried along the guiding surface has a relatively low impulse. The guiding surface has a curvature. The curvature determines the change in the direction of the velocity of the product which flows along the guiding surface. It is found that there is a relation between the speed of the blend along the guiding surface and the curvature of the guiding surface; viz. a guiding surface having a large curvature, i.e. a small radius of curvature, is likely to cause deposition of the blend in the sharply curved region. Especially in case of abruptly or discontinuously varying curvature the tendency of the blend to deposit increases significantly. In such a case the blend has insufficient impulse to overcome the large acceleration which is imposed by abrupt transitions of the guiding surface and the discontinuous curvature will break the vortex near the guiding surface. This effect is especially present in case of blends of high viscosity. Hence, breaking of vortices—which may be achieved by application of specially shaped guiding sections to redirect the slowly flowing blend back into the vortex core—the should be avoided as bridging can be aroused in viscous blends as a result of such vortex breakers.

Sudden changes in the direction of the flow cause standstill of product and breaking of the vortex. These effects can be avoided if the cross-section of the guiding surface has a tangent of a continuously varying direction along its perimeter. In case the guiding surface has a continuously varying direction along the perimeter of the cross-section an effective mixing flow of material can be maintained.

In a preferred embodiment the first portion accommodates two blade member assemblies, wherein a straight line is definable intersecting the convexly shaped curve in a first point and in a second point, wherein the distance between the first and second point exceeds any dimension of the curve in a direction perpendicular to the first straight line.

Preferably the system has no more than two blade member assemblies to reduce the costs of manufacturing and the bill of material. Each blade member assembly has a region of action. Inside such a region of action the mixture is flowing on a small scale being susceptible to direct contact with and disintegration by the rotating blades of the blade member assembly. As there are two blade member assemblies two corresponding regions of action can be discerned during the blending process. Outside the two regions of action the container has a region where mixture is held which mixture is not directly processable by the blade member assemblies. In this external region no direct contact is possible between chunks or particles in the mixture and the rotating blades of the assemblies. A uniform blend is obtained in an effective manner if an easy exchange of mixture is possible on a large scale, i.e. between the external region and the region of action of the first blade member assembly, between the external region and the region of action of the second blade member assembly and between the two regions of action of the respective two blade member assemblies. The said two regions of actions are at the base of the vortices. A cross-section through these regions of actions shows a flow pattern of the blend which is composed of two essentially circular flow patterns around each axis of rotation of the blade member assemblies. Had these flow patterns been aroused in an endless container the mixture would follow a flow pattern which forms a pattern of least resistance. Close to the axis of rotation the flow pattern is close to circular and further away from the axis of rotation the circular flow pattern amalgamates into an elongated of oblong shape. If the convexly shaped curve closely envelopes the amalgamated circular flow patterns in a conformal oblong or elongated shape, the large scale mixing is improved and bridging effects are further mitigated. Hence, the convexly shaped curve has a pronounced orientation which is elongated as to enclose the amalgamated circular flow patterns created by the blade member assemblies in a manner that forms a guiding means according to the least resistance flow pattern of an undisturbed and unrestricted blend. To accomplish this, the curve preferably is of an oblong shape, i.e. a straight line can be defined which is parallel to the length direction of the curve, which straight line intersects the curve in a first point and in a second point, wherein the distance between the first an the second point exceeds any dimension of the curve in a direction perpendicular to the length direction.

In an advantageous embodiment of the invention the two blade member assemblies are rotationally driveable around a first and a second axis of rotation, wherein the straight line is parallel to a further straight line which intersects the first and second axis of rotation.

The further straight line, which intersects the first and second axis of rotation, defines the length direction of the elongated and convexly shaped curve. Because the straight line is parallel to the further straight line through the axes of rotation, the pair of blade member assemblies has an offset with respect to the straight line. This introduces an asymmetry in the positioning of the blade member assemblies. Such an asymmetry causes a flowing of the mixture through the container not only in planes which are perpendicular to the axes of rotation of the blade member assemblies but also in a direction which is parallel to the axes of rotation of the blade member assemblies. Such parallel transport effects that mixture flows from the top of the container to the blade member assemblies at the bottom of the container and vice versa. In superposition to the circular flow patterns around the axis of rotation to transport from the bottom to the top of the container causes the blend to move with a twisting, spiraling or whirling motion, which contributes to an effective blending process.

In an advantageous embodiment of the invention each point of the convexly shaped curve has a shortest distance of less than 1 mm to a super-elliptic curve, which the super-elliptic curve is definable by a set of points (x, y) for which $$\left|\frac{x}{a}\right|^m + \left|\frac{y}{b}\right|^n = 1;\ m, n > 1;\ a > b > 0$$

The flow line pattern of an undisturbed and unrestricted blend agitated by two blade member assemblies can be closely approximated by a super-elliptic curve of the above defined mathematical form in regions which are remote from the axes of rotation of the blade member assemblies. Hence, the guiding surface of the container poses minimal resistance to the flow of the blend across the container.

In an advantageous embodiment the convexly shaped curve is an ellipse.

An ellipse defines the locus of points for which the sum of the distances from each point to two fixed points, the focal points, is equal. The regions of action of each of the blade member gradually move over to the external region. There is no clear boundary between a region of action and an external region. At the extension of an axis of rotation or at the vortex core the material is flowing at high speed, while remote from the vortex core the flowing material may experience less direct influence of the vortex flow pattern. An effective blending process is established if the guiding surface is shaped such that material which is travelling along the guiding surface under the action of a first vortex caused by the first blade member assembly increases its distance from the core of the first vortex while simultaneously proportionally decreasing its distance to the core of the second vortex caused by the second blade member assembly. An elliptic shape of the convexly shaped curve secures such proportional transition from the region of action of one blade member assembly to the region of action of the other blade member assembly.

In an embodiment of the invention the blade member assemblies are accommodated in a chamber formed in the first portion of the container at a bottom side thereof, which chamber collects, during use, the blend of materials under the action of gravity, whereby said blend is guided into a region of action of the blade member assemblies.

Forced by gravity, the blend flows in the direction of the chamber accommodated at the bottom of the first portion. The chamber accommodates the blade member assemblies in such manner that the blend is collected and guided into a region of action of the blade member assemblies under the action of gravity. Thus, small quantities of blends are processable. If the container has a large flat bottom surface, the blend would spread out over such surface. If only a small quantity of blend is present in such flat bottom container, the blend would remain outside reach of the blade member assemblies. Hence, in such a flat bottom container, small quantities of blend are not processable. More shapes of the bottom container are conceivable which are unapt to collect and guide into the region of action of the blade member assemblies such as a spherical shape. In case of a flat or spherical shape the blend can flow towards a wall portion outside the region of action of the blade member assemblies. Preferably the chamber has a cross-section in a vertical plane of a shape which is apt for gathering a small amount of mixture, such as for example a tapered or conical shape. The chamber preferably has walls which closely surround the orbits described by the tips of the rotating blades of the blade member assemblies. The walls of the chamber should preferably be so close to the orbits of the tips, that especially in viscous blends all constituents of the blends inside the collecting chamber are kept inside the region of action of the blade member assemblies.

In an advantageous embodiment both blade member assemblies have one or more blades, each blade having a blade tip at an end which is radially remote from its axis of rotation, wherein the chamber has a first and a second wall portion, which first and second wall portions are arranged conformal to the orbits described, during use, by the tips of respective blade member assemblies, to cooperate during use, with said tips.

The conforming wall portions of the chamber can be used to jam, wrench or squeeze the constituents in the mixture around the blade assemblies into a space which is formed between the conforming wall portion and the tips. The space should be relatively narrow compared to the desired size of the particles in the blend. Thereto the wall portions should closely envelope the path or orbits described by the tip of the blade assemblies. Thus, the conformal wall portions can be designed to ensure a good channeling of the material to the blades of the assemblies which contributes to a fine graining structure of the blend ingredients. The fineness of the graining structure is determined among others by the width of the gap between the wall portions and the orbits of the tips.

Where such a conformal wall portion is provided partly around the first assembly the constituents in the mixture are transported by the blades of the first assembly along the corresponding first wall portion which conforms to and closely envelopes a part of the path described by the tips of the first assembly. The first conforming wall portion prevents that constituents transported by the first assembly leave the region of action of the first assembly. After being transported by the first assembly these constituents are transported into a region of action of the second blade member assembly. Hence, the first conformal wall portion associated with the first blade member assembly should not completely envelope the first blade member assembly to enable an unhindered subsequent passage of the constituents into a region of action of the second blade member assembly along a direct path from the region of action of the first blade member assembly into the region of action of the second blade member assembly. Likewise, the second wall portion should be conformal to the orbits described by the tips of the second blade member assembly while still leaving enough opportunity to interchange material with the region of action of the first blade member assembly. The first and second wall portions should envelope the path of the blend constituents up to such closeness that the said cooperation—jamming, wrenching and squeezing of the constituents—between a tip and the wall portion can be effectively accomplished without leaving so-called blind areas. In blind areas portions of the mixture or ingredients can deposit, stick to the wall and remain there without being transported.

In an embodiment according to the invention the first and second wall portions join together as to form a flow guide for guiding a blend of ingredients towards the blade member assemblies under the influence of gravity, wherein the assemblies are arranged in mutual co-operational proximity.

To get optimal cutting results, the material to be blended should preferably be channeled and forced into small gaps which are formed between the tips and the wall portions, said wall portions being close to the tips. To ensure an optimal material circulation along all surfaces of the container and specifically along all surfaces of the chamber, the said wall portions shall be smooth and rounded around the orbits of the tips as far as possible. However, as described here above, the wall portions may not completely envelope the first blade member assembly or the second blade member assembly, because an unhindered passage of the constituents between the regions of action of the two blade member assemblies should remain possible. The first and second wall portions have first and second cross-sections which conform to a circular path described by the tips. The first assembly is arranged in co-operational proximity of the second assembly, i.e. the region of action of the first assembly has an overlap with the region of action of the second assembly. The overlap is a region where both the assemblies can affect the mixture. This proximity extends up to a point that the first assembly cannot run safely and free without running into a part of the second assembly. Such a collision between blades of the first and second assembly can be avoided for example by placing the blades of the first and second assembly under different angles with respect to their axes of rotation or by placing the blades of the first and second assembly at different heights. By such an arrangement the tips of the first and second assembly describe circular orbits in parallel and non-coinciding planes. Alternatively, the distance between the blade member assemblies can be chosen such that a collision between tips is not possible. The blades of the first and second assembly move through a range which can be projected along their axes of rotation. Such axial projections are of a circular shape.

In an arrangement wherein the regions of action of the assemblies form an overlap, the zone where the regions overlap corresponds to a zone of mutual co-operational proximity, i.e. both assemblies can operate on the blend. The existence of a zone of mutual co-operational proximity is advantageous for an effective blending process. Where the axial projections are separated, e.g. by application of small tip distances or a large distance between the assemblies, care should be taken to establish the zone of co-operational proximity.

A circular zone around each blade member assembly now consists of a zone where the blade member assembly is cooperating with its conformal wall portion of the chamber and a zone where the blade member assembly is in mutual co-operational proximity with the other blade member assembly.

Hence, a flow of ingredients which is directed downwards towards the chamber either enters the gap between the chamber wall and one of the assemblies or is guided by the flow guide into the overlapping region of co-operational proximity. Blind areas can thus be avoided.

In an advantageous embodiment of the invention the chamber is accommodated eccentrically in the bottom portion of the container.

After being processed by the assemblies a part of the blend exits the chamber and is guided away from the assemblies. Eccentric accommodation introduces an asymmetry in the flowing pattern of the blend. This asymmetry can be advantageously used to mitigate an abrupt change of direction in the flow of the blend leaving the chamber.

BRIEF DESCRIPTION OF THE DRAWINGS

These and other aspects of the blender system of the invention will be further elucidated and described with reference to the drawings, in which.

DETAILED EMBODIMENTS

Figure 1:
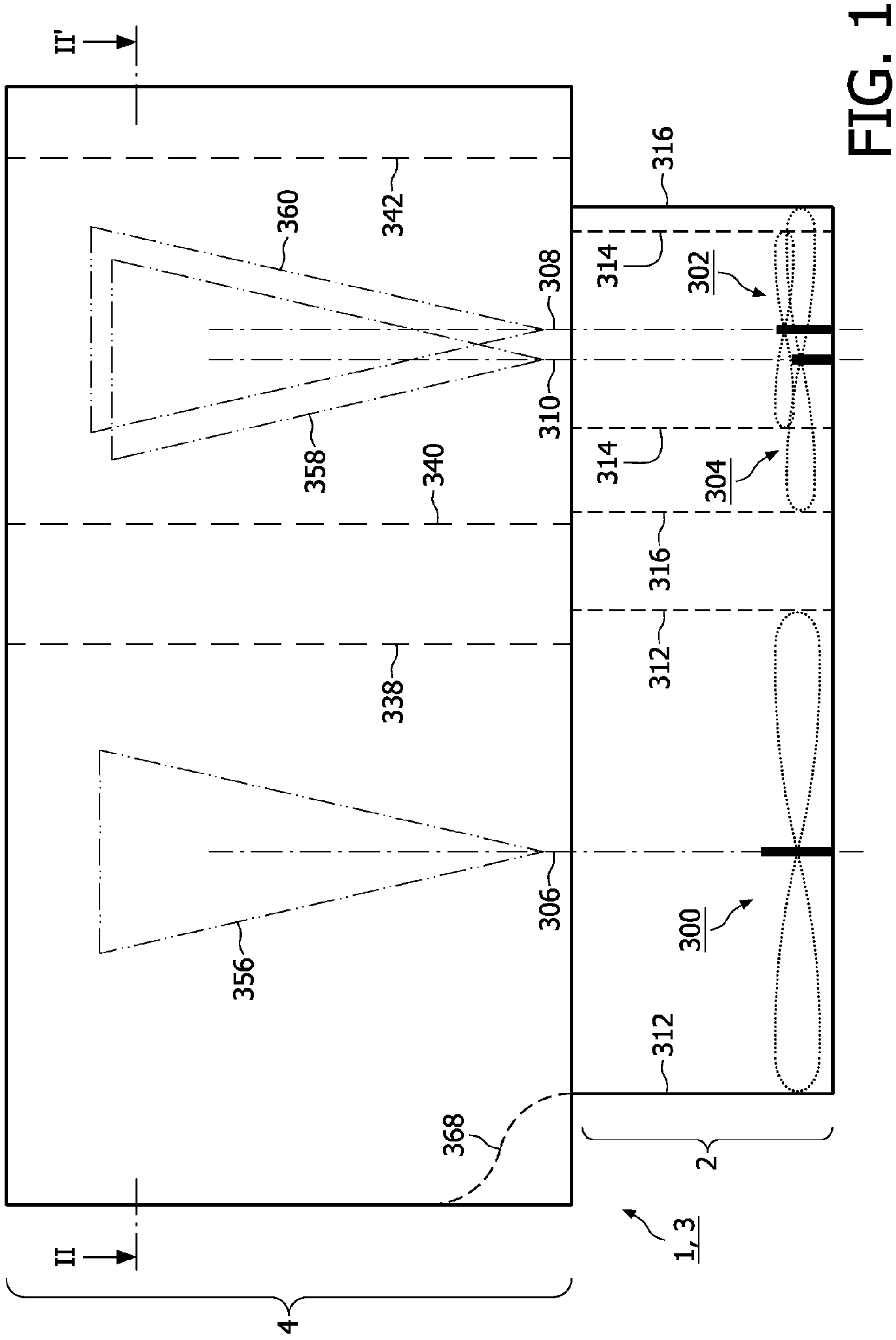
FIG. 1 is a side view of a container of a blender system.
Figure 2:
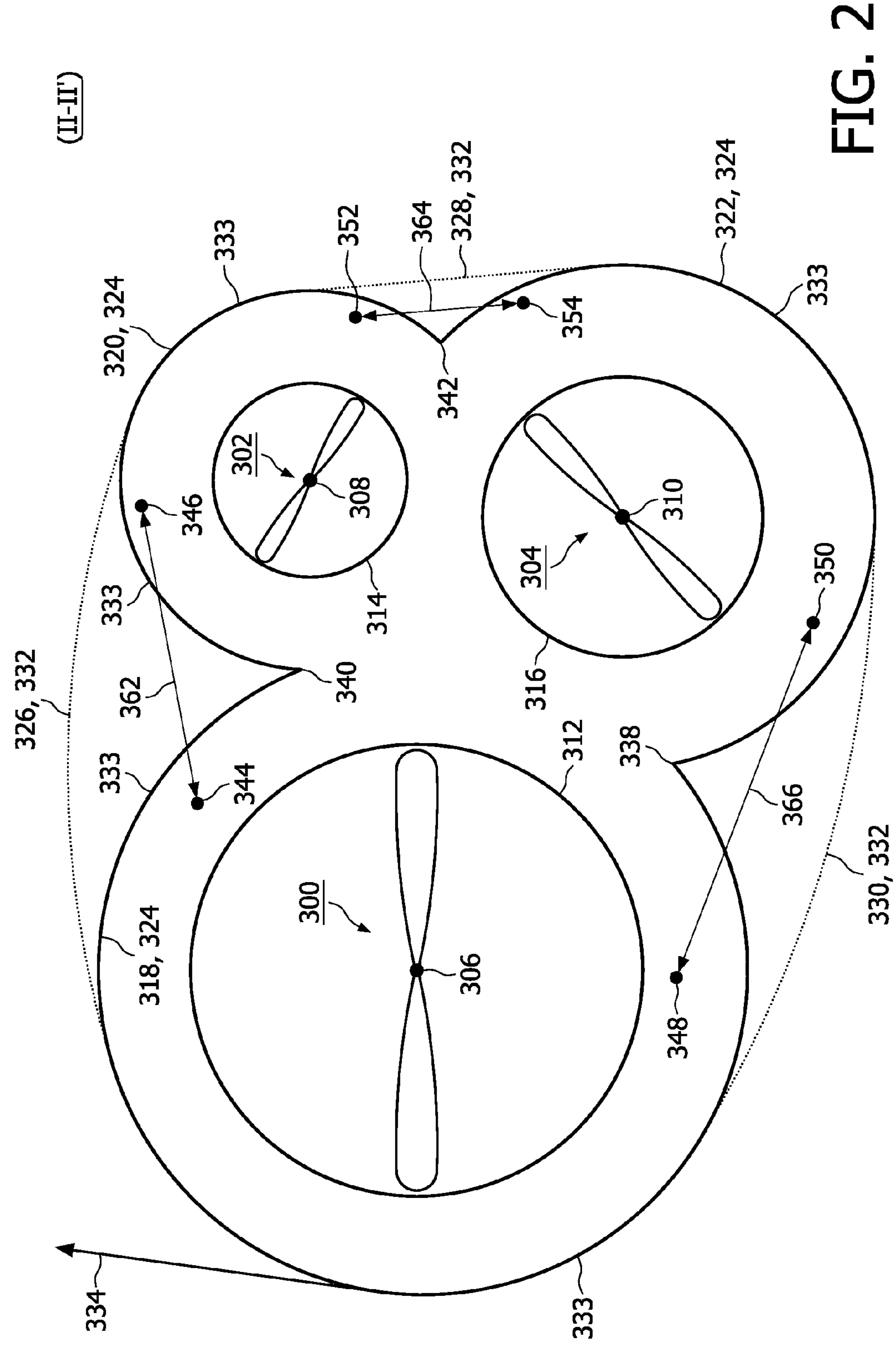
FIG. 2 is a sectional view of the system of FIG. 1.

In FIGS. 1 and 2 a container 3 of a blender system 1 is depicted in side and top view, respectively. The container 3 has a first portion (left brace 2 in FIG. 1). The first portion 2 accommodates three blade member assemblies 300, 302 and 304. The blade member assemblies 300, 302 and 304 are rotationally driveable around axes of rotation 306, 308 and 310, respectively. The first portion 2 has three wall portions 312, 314 and 316 of a cylindrical shape. Each wall portion 312, 314 and 316 accommodates a blade member assembly 300, 302 or 304. The container 3 has a second portion 4 (left brace 4 in FIG. 1) mounted on top of the first container portion 2. During use the container 3 is filled with material to be blended. The material is processed by the blade member assemblies 300, 302 and 304 in the first container portion. During blending exchange of material between the first and second portions 2 and 4 will occur. The rotation of each blade member assembly 300, 302 and 304 causes a flow pattern in the blend in the first and second portions 2 and 4. This flow pattern is indicated by three dash dotted triangles 356, 358 and 360. The flow pattern resembles to the flow pattern of a vortex. Each vortex has a vortex core which forms a continuation of the axes of rotation 306, 308 and 310. The first and second portions 2 and 4 of the container 3 are—according to an aspect of the invention—connected by a surface 368 of a continuously varying curvature. Surface 368 is indicated by a dashed line. Such a surface minimizes the resistance for exchange of material between the portions 2 and 4. Minimisation of resistance for material exchange is aimed at in all embodiments according to the invention.

In FIG. 2 a top sectional view is depicted of the container 3 at a level which is indicated in FIG. 1 as II-II'. The second container portion 4 has three curved wall portions 318, 320 and 322. The wall portions 318, 320 and 322 join together at ribs 338, 340 and 342. Thus a closed container portion is formed for keeping the material inside the second portion 4 of container 3. At the inside of the wall portions 318, 320 and 322 the material which is blended is guided along a guiding surface 324. The cross-section of the guiding surface 324 is indicated by a curve 333. In FIG. 2 curve 333 coincides with wall portions 318, 320 and 322. Curve 333 is not convexly shaped as will be explained here below.

A particle in the material or blend inside the second portion 4 at a position 344 is hindered by the guiding surface 324 (In FIG. 2 coinciding with curve 333) to go to a position 346 along a straight line 362. The same applies for trajectories between positions 352 and 354 along line 364 and between positions 348 and 350 along line 366. As explained above this blocking by the guiding surface 324 (and curve 333) is a disadvantage for an effective blending process and for the homogeneity of the blend. According to the invention the guiding surface 324 should be arranged to enable a free passage along straight lines between any pair of point, for example between the points 344 and 346, 352 and 354 and 348 and 350. Such unrestricted and free passage along straight lines between any pair of two points is possible if—according to the invention—wall portions such as 326, 328 and 330 (indicated round dotted) are applied. Application of such wall portions 326, 328 and 330 results in a guiding surface 332 which can be characterised by a convexly shaped curve 336 (shown as a solid curve 336 in FIG. 3).

Figure 3:
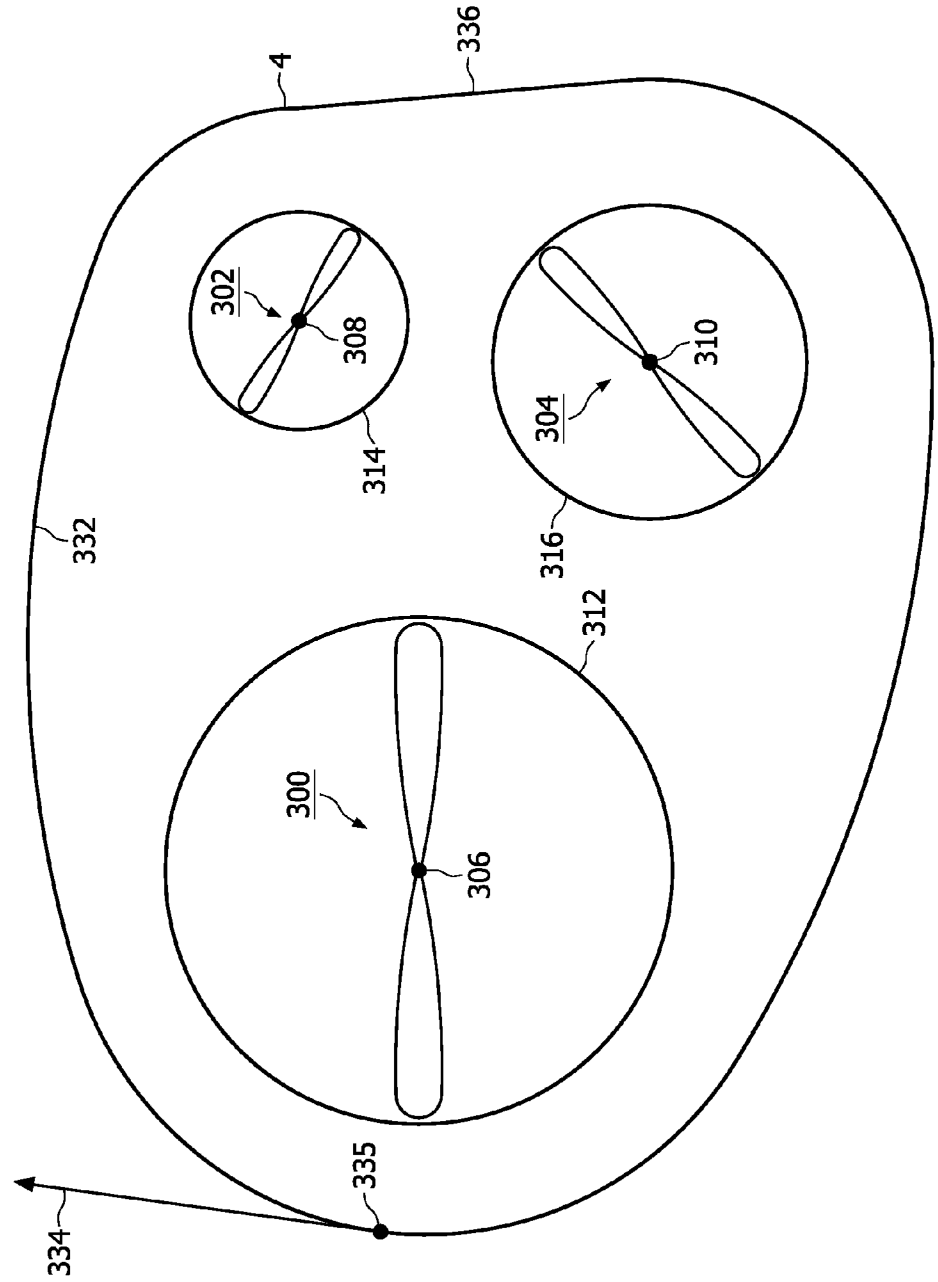
FIG. 3 is a sectional view of a container according to the invention.

In FIG. 3 the cross-section 333 of the guiding surface 332 is indicated by a closed curve 336. According to the invention curve 336 is convexly shaped. An arrow 334 in a point 335 represents the direction along which the blend is guided by the guiding surface 332. The arrow 334 has the direction of a line which is tangent to curve 336 in point 335. While being guided along the guiding surface 332 of FIG. 3, the blend continuously varies its direction of motion, because the tangent line continuously varies its direction while going through all subsequent points of curve 336, i.e. along the perimeter of curve 336.

Figure 4B:
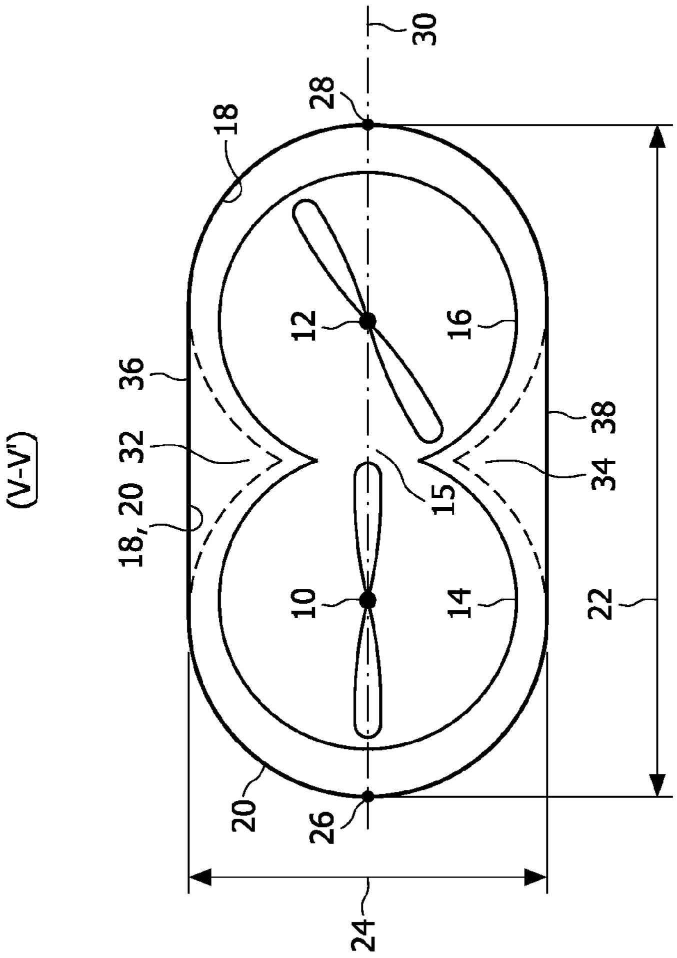
FIG. 4*b* is a sectional view of the system of FIG. 4*a*.
Figure 4A:
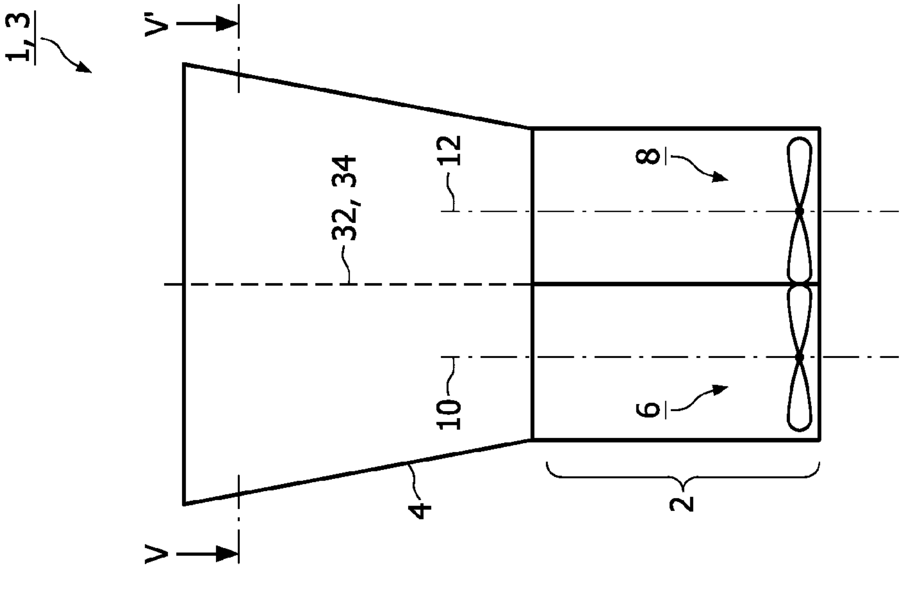
FIG. 4*a* is a side view of a blender system.

In FIG. 4*a* a blender system 1 having a container 3 is depicted. The container has a first container portion 2 and a second container portion 4. The first container portion 2 accommodates two blade member assemblies 6 and 8. The blade member assemblies 6 and 8 are rotationally driveable around axes of rotation 10 and 12, respectively. The second portion 4 has a tapered shape. This tapered shape allows material to flow freely between the blade member assemblies 6 and 8 at the bottom of the container 3 and the top part of the container. An opening angle of the second portion 4 of container 3 between 2 and 4 degrees ensures an efficient exchange of blending material between the top and bottom of the container. Indentations 32 and 34 (indicated by dashed lines) should be avoided according to the invention as they form a concave instead of a convex cross-section. These indentations, which according to the invention should be avoided) will be discussed here below (FIG. 4*b*).

FIG. 4*b* shows a sectional view of the second container portion 4 taken along V-V'. Contrary to the arrangement as depicted in FIGS. 1 to 3—where the blade member assemblies are each accommodated in separate cylinders—the first portion 2 of the embodiment of FIG. 5 houses the blade member assemblies 10 and 12 in a joint arrangement of two partial cylinders 14 and 16. Blending material which is present inside the region of action of blade member assembly 10 can be exchanged to the region of action of blade member assembly 12 via an opening 15. The second portion 4 has a guiding surface 18. The cross-section of guiding surface at level V-V' is indicated by a solid a curve 20, which coincides in the representation of FIG. 4*b* with the guiding surface 18. According to the invention curve 20 is convexly shaped. A straight line 30 intersects curve 20 in a first point 26 and in a second point 28. The distance between the first point 26 and the second point 28 is indicated by an arrow 22. Dimensions of curve 20 in a direction perpendicular to line 30 are indicated by an arrow 24. Curve 20 being of an elongated shape, dimension 22 exceeds any dimension 24 of the curve 20 in a direction perpendicular to the straight line 30.

FIG. 4*b* shows indentations 32 and 34 formed by dashed continuations of the circular parts of curve 20. According to the invention such indentations 32 and 34 should be avoided as they frustrate an unhindered passage of material between the two vortices which are formed during blending. The indentations 32 and 34 block the flow between the vortices which are formed by the rotation of the blade member assemblies 6 and 8. The indentations are conflicting with the requirement of a convex shape of the curve 20. Instead of the indentations 32 and 34 the convex shape is established according to the invention by straight line segments 36 and 38.

Figure 5:
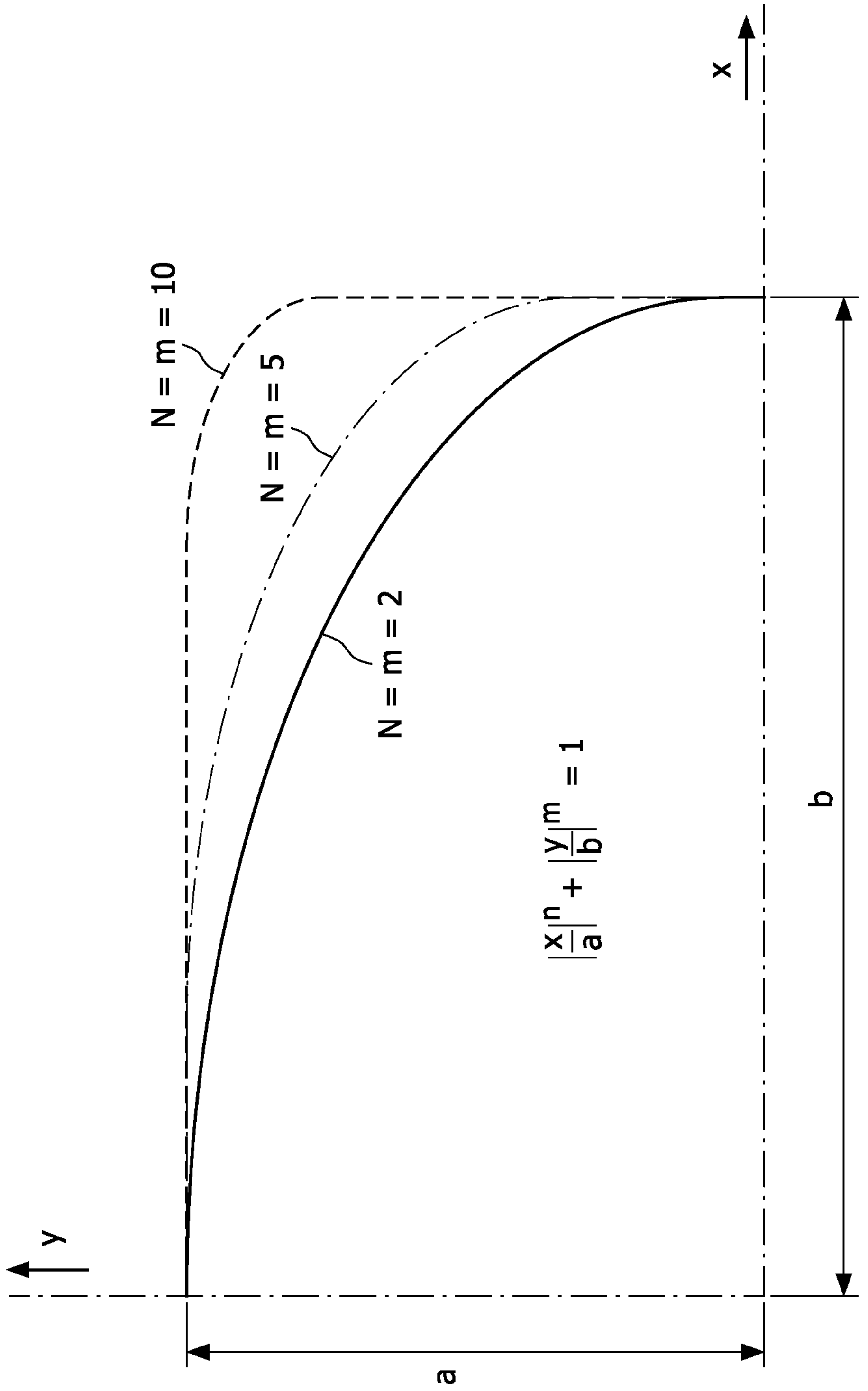
FIG. 5 is a graph of super-elliptic curves.

In FIG. 5 graphs of super-elliptic curves are depicted. A super-elliptic curve can be defined in the Cartesian coordinate system as a set of points (x, y) with $$\left|\frac{x}{a}\right|^m + \left|\frac{y}{b}\right|^n = 1;\, m, n > 1;\, a > b > 0$$

For n, m>=1 the shape of the curve is convex. Parameters a and b are so-called radii of the oval shape. The case n=m=2 yields an ordinary ellipse; increasing n and m beyond 2 yields hyper-ellipses, which increasingly resemble rectangles; decreasing n and m below 2 yields hypo-ellipses. Hypo-ellipses have corners in the x and y directions and approximate a cross-form at decreasing values of n and m. The case n=m=1 yields a line with slope −b/a and y-intersect of b. A value of n which is different from the value of m will result to different a curvature in the corner section of the curve. Such different values for n and m can be applied to compensate for the dimensions a and b. Different values for n and m can also be applied to shape cross-sections of the guiding surface to optimise the flow pattern along said guiding surface at different heights of the second container portion. Super-elliptic curves as defined above constitute convexly shaped curves. Such curves can in parts or as a hole be arranged as to form convexly shaped curves. It is for example possible to build a convexly shaped closed curve from pieces of a super-elliptic curve and straight line segments. Such examples will be explained according to FIGS. 7 and 8.

Figure 6:
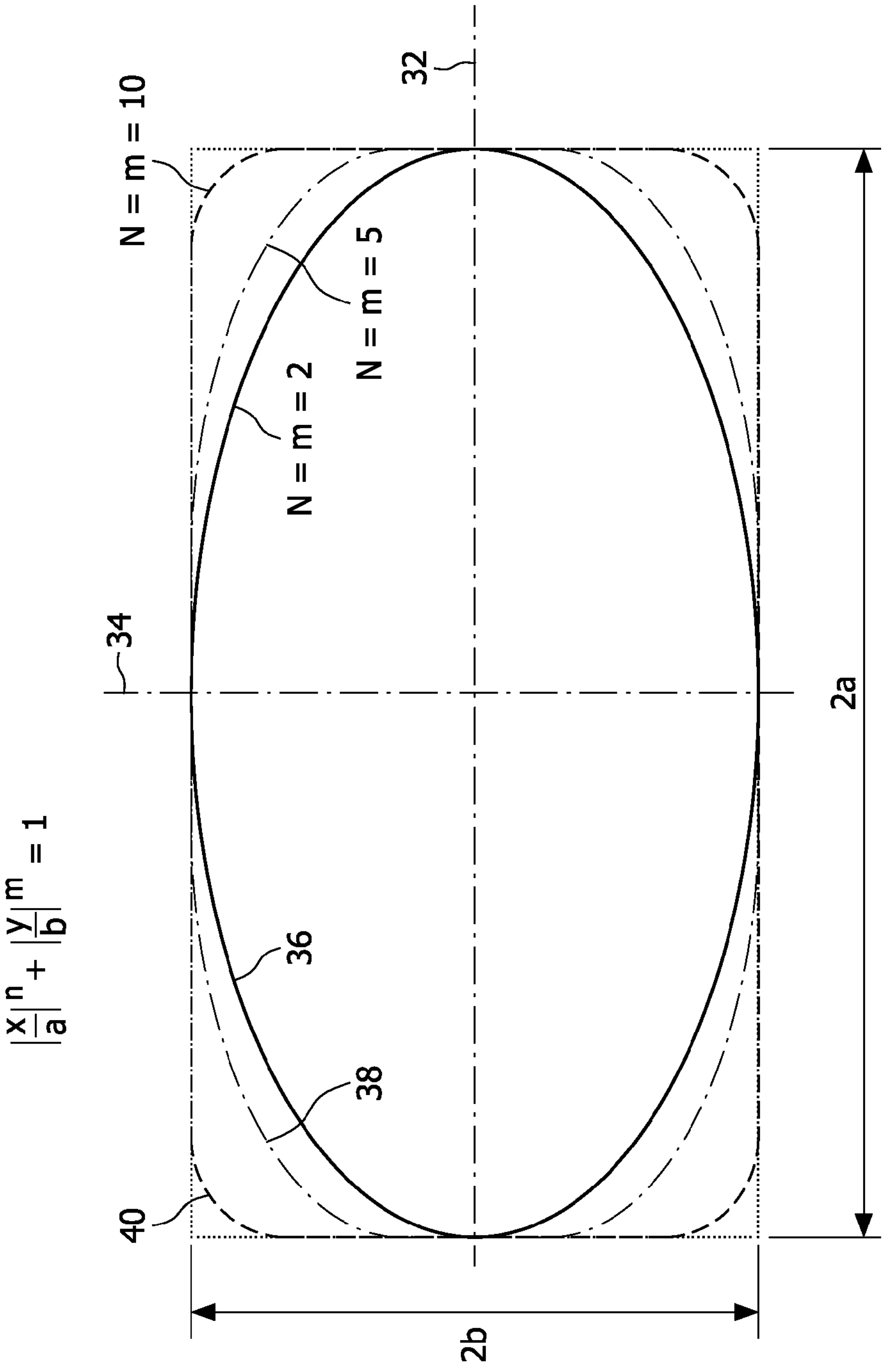
FIG. 6 is a graph of closed super-elliptic curves.
Figure 7:
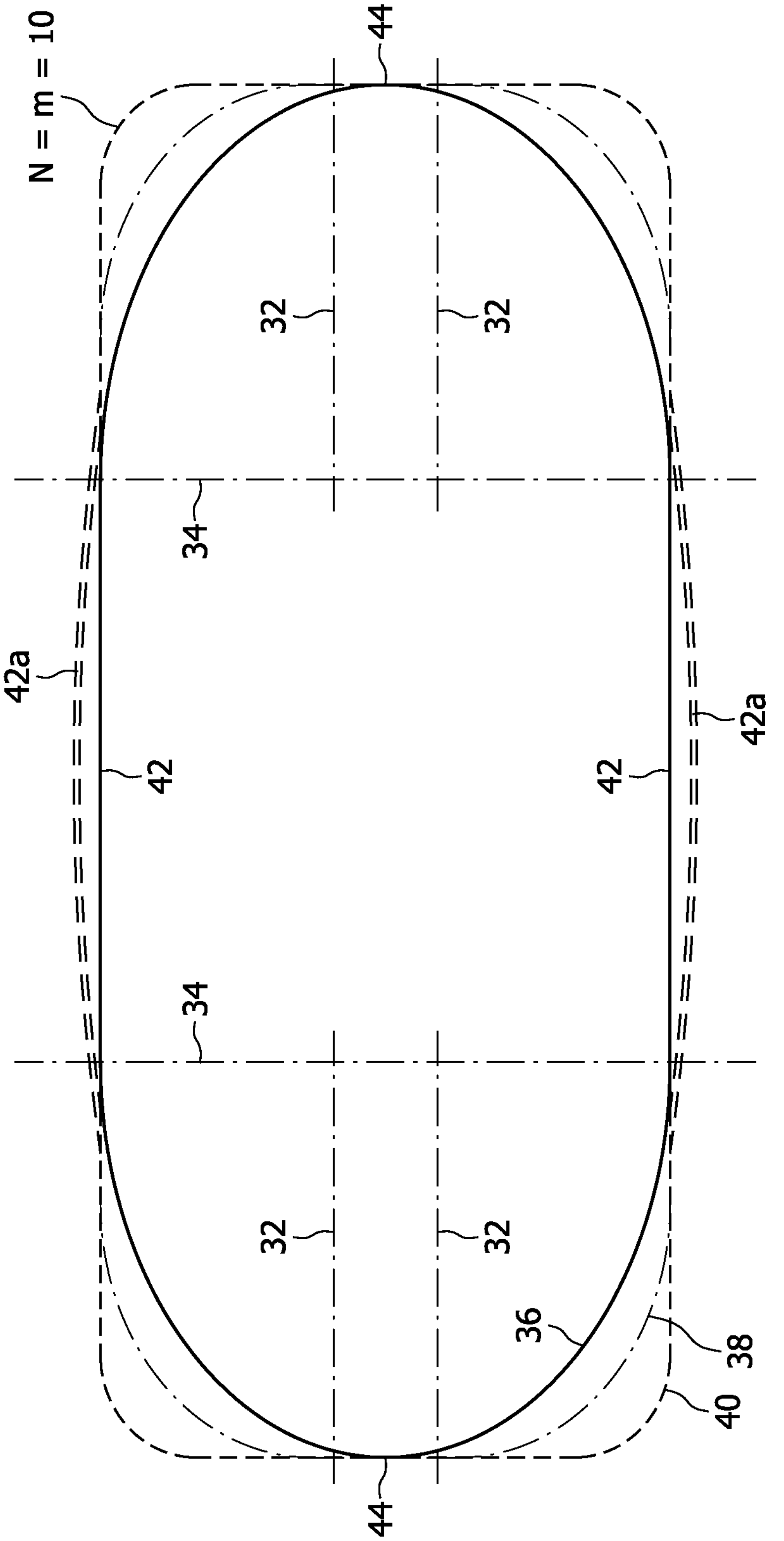
FIG. 7 is a graph of closed super-elliptic curves.

In FIG. 6 three super-elliptic curves 36, 38 and 40 are indicated. Each curve has a length dimension of 2*a* along a length axis 32 and a width 2*b* along a width axis 34. Length axis 32 and width axis 34 are symmetry axes of the three super-elliptic curves 36, 38 and 40. An elongated shape containing portions of the same super-elliptic form is depicted in FIG. 7. Straight line segments 42 and 44 connect the super-elliptic segments enclosed by lines 32 and 34. In FIG. 7 the portions connecting the straight line segments 42 and 44 are of a super-elliptic form. These portions 44 can also be of a circular form. Although the line segments 42 in the embodiment of FIG. 7 are straight it is advantageous to apply curved portions 42*a*. Such curved portions contribute to a better joining of the two vortices and have a favourable effect with regard to the production of noise. The blade member assemblies rotate at a high angular velocity in the order of magnitude of 10000 revolutions per minute. The walls of the container 3 are relatively sensitive to bending phenomena in the segments 42 as these segments represent flatness of the container in one direction. It is favourable to provide at least some curvature as the stiffness of container increases significantly if this container structure is built as a shell structure instead of a plate structure. To preserve the convexity of the curve the portions 42*a* should bulge out. This is also favourable for a better joining of the vortices which are induced by the rotating blade member assemblies (not shown). These technical effects which apply to all the embodiments will be further described elucidated in the embodiment of FIGS. 15 and 16.

Figure 8A:
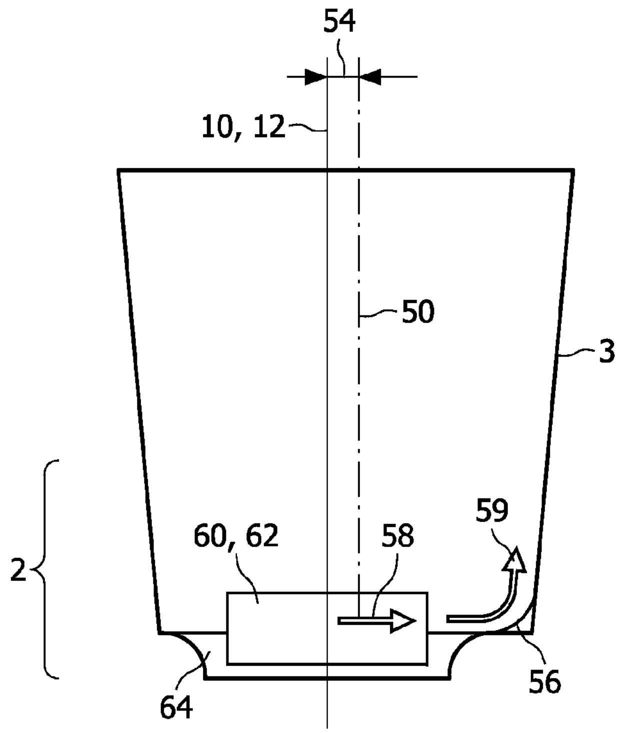
FIGS. 8*a* to 8*d* are different views of a blender system.
Figure 8B:
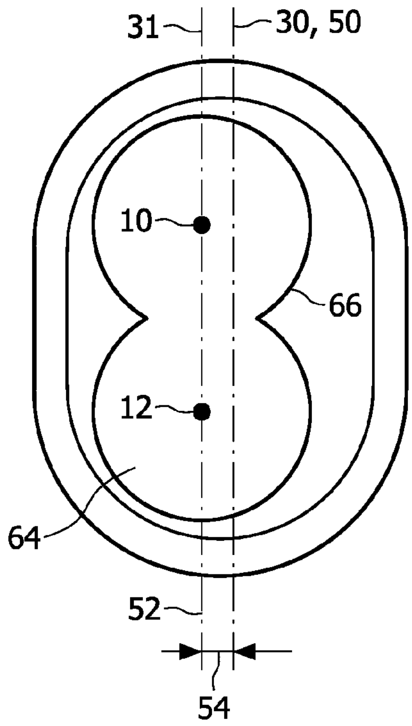
Figure 8C:
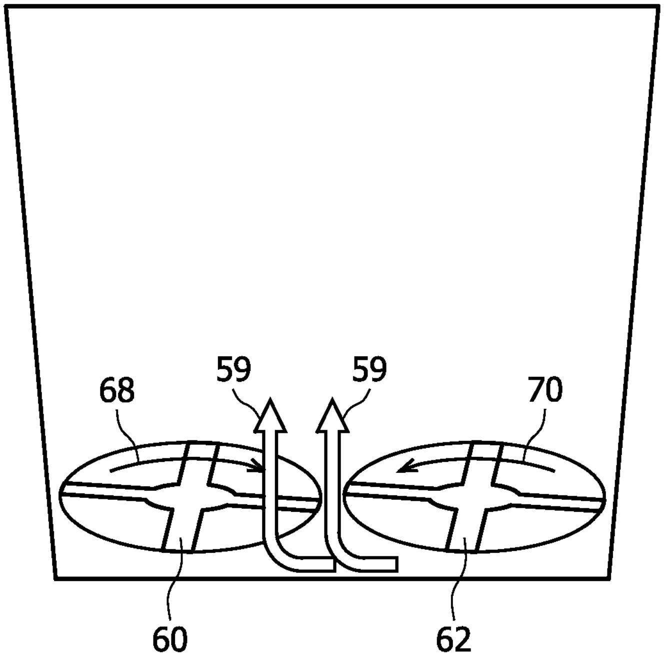
Figure 8D:
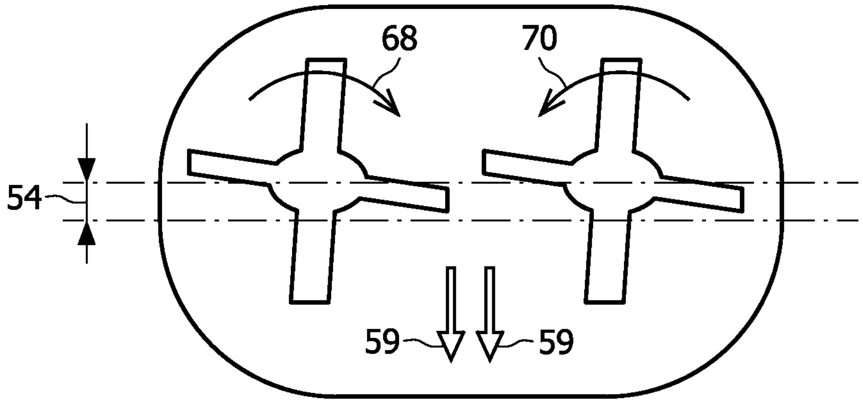

In FIGS. 8*a* to 8*d* an embodiment of the blender system of the invention is schematically depicted, wherein circulation of material is further optimised. FIG. 8*a* shows a side view. The material flow around blade member assemblies 60 and 62 is schematically indicated by a horizontally directed arrow 58 and a bent arrow 59. The container 3 has a ramp 56 which smoothly directs the flow upwardly according to arrow 59. The blade member assemblies 60 and 62 are accommodated in a chamber 64. The chamber 64 is formed in the first portion 2 at a bottom side thereof and collects, during use, the blend of materials, under the action of gravity. The blade member assemblies 60, 62 are driveable around axes of rotation 10 and 12. In the view of FIG. 8*a* the axes of rotation 10 and 12 coincide. The axes of rotation 10 and 12 are positioned at an offset 54 relative to a centre plane 50 of the container 3. By virtue of the offset 54 a more gradual redirection of the flow from a horizontal direction corresponding to arrow 58 to a vertical direction corresponding to arrow 59 the chamber 64 is possible. The extent of eccentricity or offset 54 is also indicated in FIG. 8*b* between a centre line 30 of the container 3 and a centre line 52 of the chamber 64. Centre line 30 is positioned in the centre plane 50 of the container 3. Centre line 52 of the chamber 64 intersects the axes of rotation 10 and 12. In the top view of FIG. 8*b* the centre line 52 coincides with a further straight line 31. Hence, further straight line 31 intersects with both the axes of rotation 10 and 12. The offset 54 enables a more gradual and smooth redirection of the flow along ramp section 56. By virtue of the offset the curvature of the ramp 56 can be kept moderate. A moderate curvature is advantageous for a flow which can flow in an undisturbed manner. Chamber 64 has a wall 66 in the form of an open figure 8. In FIG. 8*c* a front view of the blender system is depicted. Arrows 59 show how the flow is directed upwards as a result of the rotation of blade member assemblies 60 and 62. The direction of rotation of blade member assemblies 60 and 62 is indicated by arrows 68 and 70, respectively. In FIG. 8*d* a top view of the blade member assemblies 68 and 70 is shown.

Figure 9:
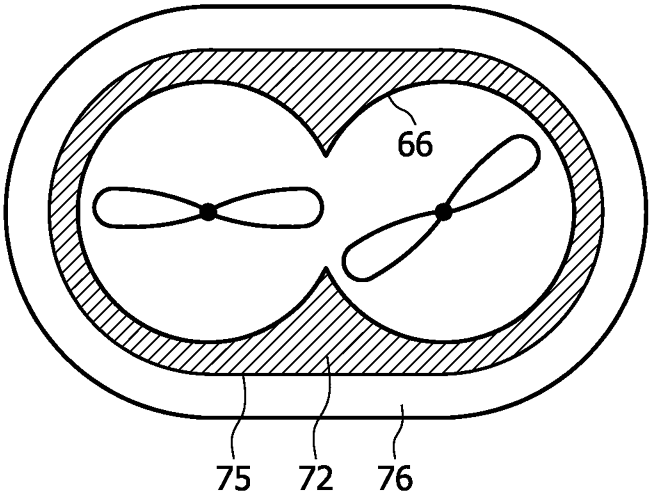
FIG. 9 is a top view of an inlay.
Figure 10:
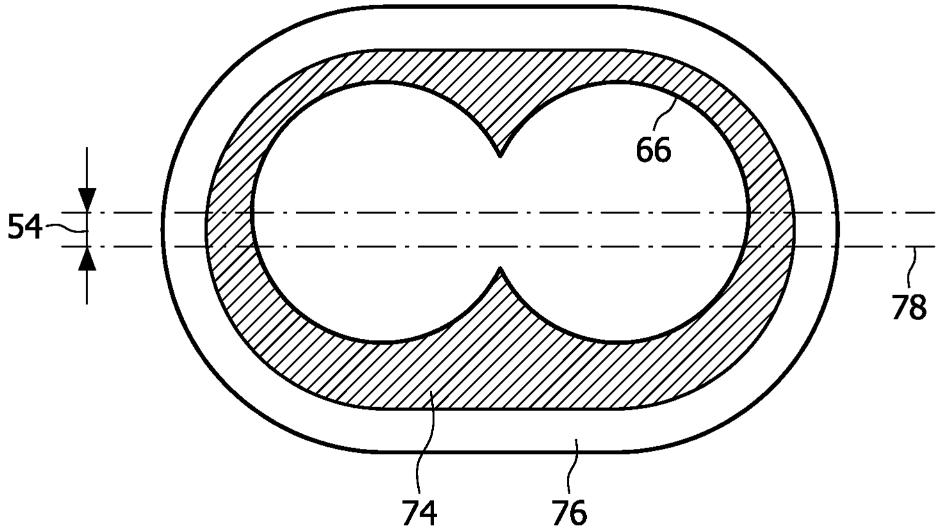
FIG. 10 is a top view of an inlay.
Figure 11:
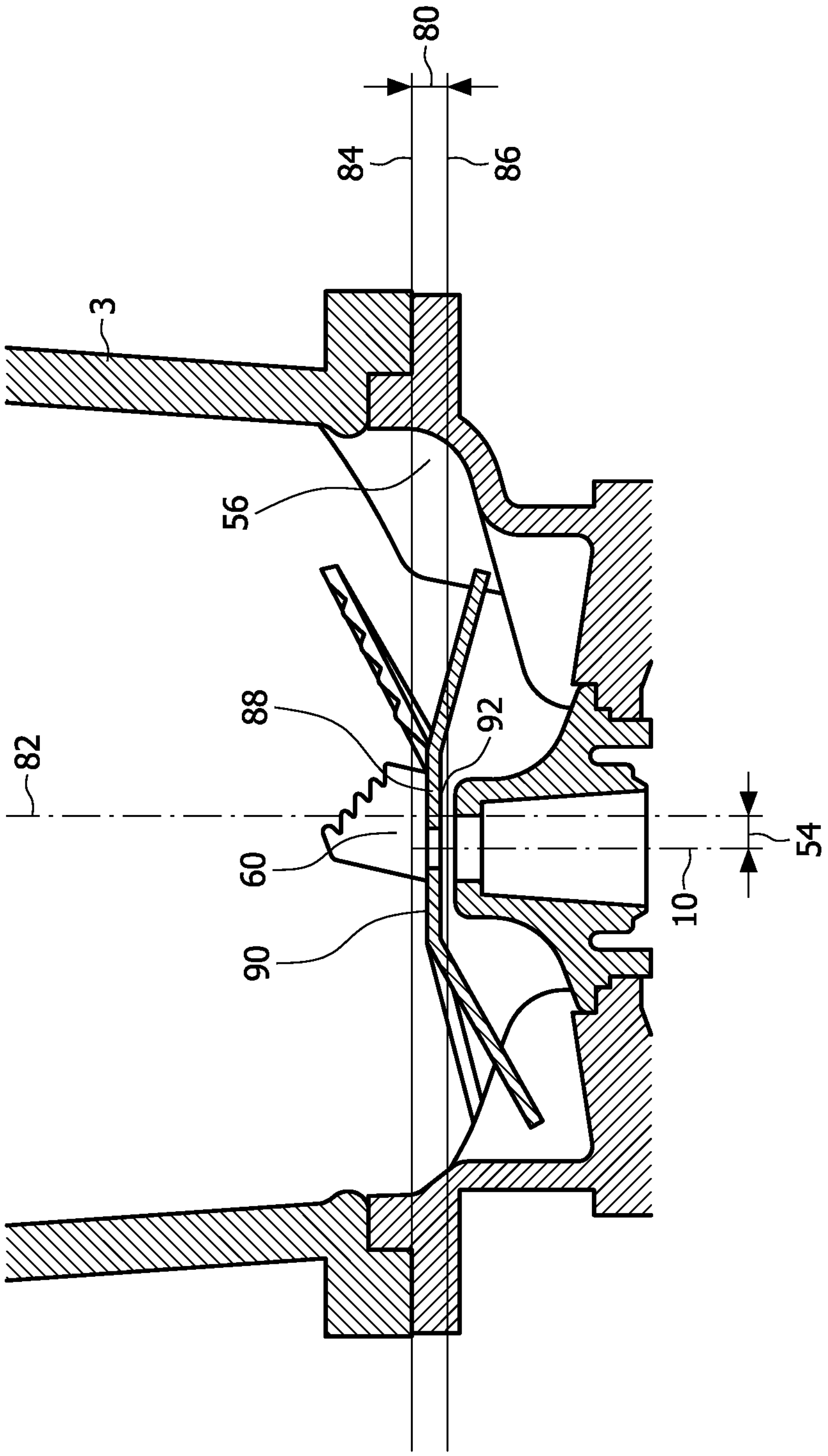
FIG. 11 is a sectional view of a blender system.

A convenient way of establishing an envelope around the blade member assemblies is by using one or more inlays as shown in FIGS. 9 and 10. In FIGS. 9 and 11 the inlays are indicated by hatched patterns. FIG. 9 shows an inlay 72 having an opening 66. Opening 66 has the shape of an open figure 8. On the outside inlay 72 conforms to an inner surface 75 of a wall 76 of the first portion 2 of container 3. In FIG. 10 an opening 66 of inlay 74 is arranged eccentrically with respect to a center line 78 of wall 76. The offset 54 has a similar function as indicated here above according to FIG. 8. The height 80 of the inlays in relation to the position of the knives is a parameter of critical importance (see FIGS. 11 and 12).

In FIG. 11 a sectional view is depicted showing a cross-section through the bottom part of a container 3 (hatched area). A blade member assembly 60 is driveable around an axis of rotation 10. Blade member assembly 60 has blades which are at an inclination with respect to axis of rotation 60. Blade member assembly 60 has a central portion 88 which is arranged in a horizontal plane. The blades of blade member assembly 60 are inclined with respect to the central portion 88. Axis of rotation 60 is arranged at an offset 54 with respect to centre line 82 of container 3. Offset 54 makes room for additional space to position a redirection ramp 56 for redirecting the flow of blend. Two solid lines 84 and 86 delimit a vertical range 80. Line 84 indicates a preferred maximum level of the top surface of the inlay 74. Line 86 indicates a preferred minimum level of the top surface of the inlay 74. The preferred maximum and minimum level are dependent on the level of the central portion 88. As can be seen in FIG. 11, vertical range 80 encloses the central blade portion 88. Line 84 should preferably not exceed the top surface of the central portion 88 of the blade member assembly by more than 5 mm, whereas line 86 should preferably not be positioned at a level which is more than 5 mm below the top surface of the central portion 88 of the blade member assembly. Hence, the range 80 constitutes a range, wherein the top surface of the inlay 74 is accommodated with respect to the central portion 88 of the blade member assembly 60. The range 80 wherein the inlay 74 is positioned determines to a large extent an appropriate functioning of the blades of the blade member assembly 60 with regard to transporting and cutting of the blend. The inlay 74 should preferably smoothly associate with the lowest part of ramp 56 to avoid deposition of blend at the transition from top surface of the inlay to the ramp 56.

Figure 12A:
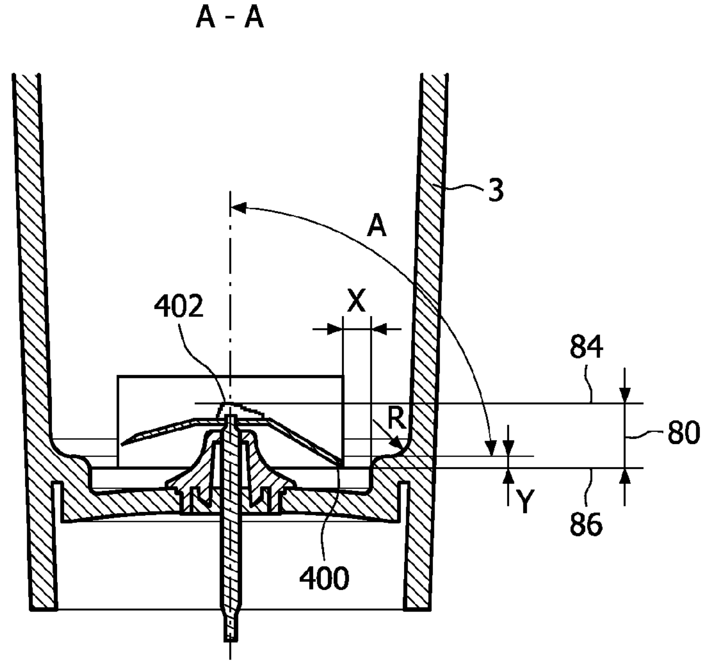
FIG. 12*a* is a sectional view of a blender shown in FIG. 12*b*.
Figure 12B:
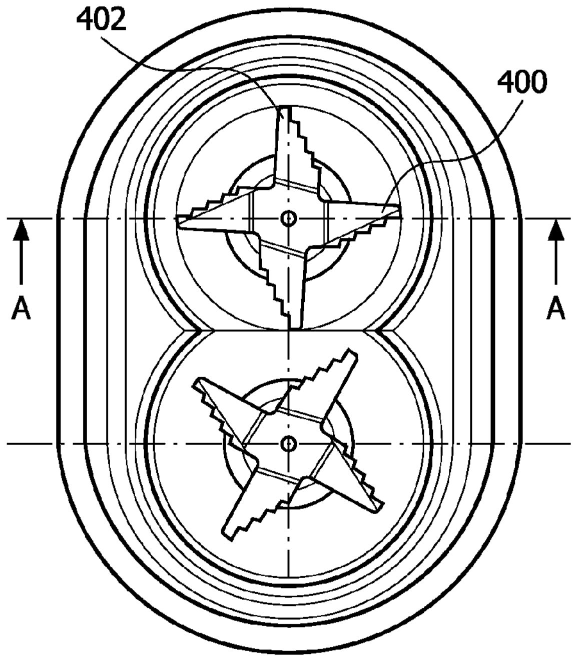
FIG. 12*b* is a top view of the blender of FIG. 12*a*.

FIG. 12*a* shows a sectional view of a container 3 of a blender system. FIG. 12*b* shows a top view of the system of FIG. 12*a*. Each blade member assembly has four blades which are arranged in a perpendicular orientation (FIG. 12*b*). The blades are at an inclination with respect to a horizontal plane (FIG. 12*a*). In FIG. 12*a* the silhouette of the blades of one blade member assembly are depicted. A lowest tip 400 is at a vertical level indicated by line 86. A highest tip 402 is at a vertical level indicated by line 84. A range 80 is indicated between lines 86 and 84. The top surface of an inlay 74 should at least be within range 80, i.e. between lines 86 and 84. If the top surface of the inlay is outside range 80 the effectiveness of the blending process rapidly decreases. However, the best blending result is obtained if the level of the top surface of the inlay 74 is positioned as described according to FIG. 11, i.e. in a range closely around the central portion 88 of the blade member assemblies.

Figure 13A:
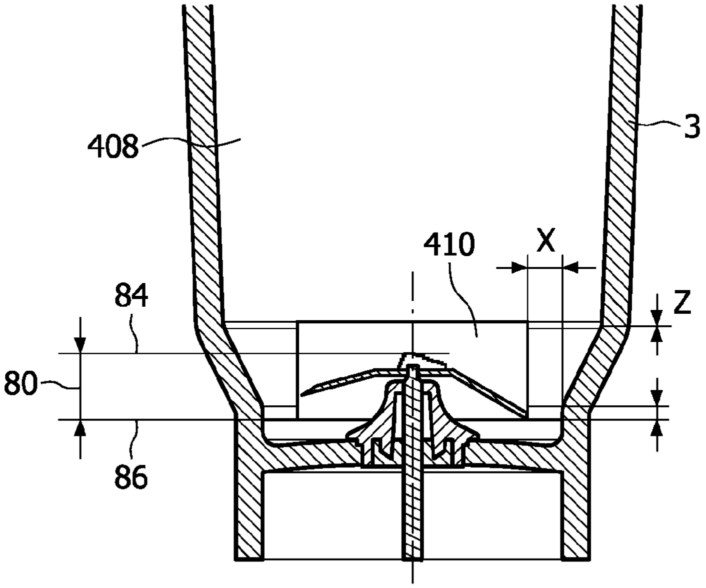
FIG. 13*a* is a sectional view of a blender shown in FIG. 13*b*.
Figure 13B:
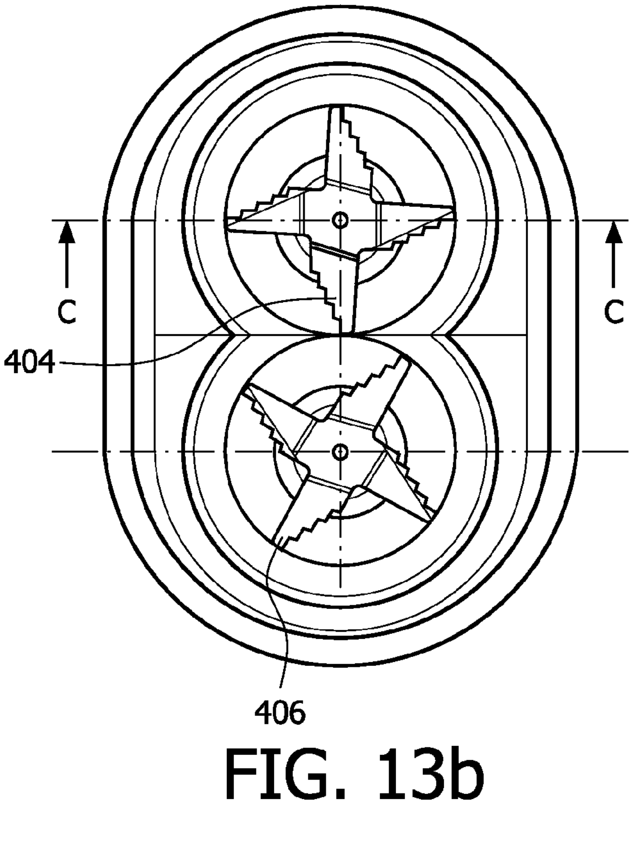
FIG. 13*b* is a top view of the blender of FIG. 13*a*.

FIG. 13*a* shows a sectional view of a container 3 of a blender system which is similar to FIG. 12 *a*. FIG. 13*b* shows a top view of the system of FIG. 13*a* which is similar to FIG. 12*b*. The embodiments of FIGS. 12 and 13 have a different form of container 3. In FIG. 12*a* the vertical wall of container 3 connects to a horizontal portion at the level of the lowest tip 400 via a curved section of a radius R. In the embodiment of FIG. 12 the top level of the inlay should closely connect to the curved part at the level of radius R to avoid deposits of material. In the embodiment of FIG. 13 the vertical wall is chamfered of a distance indicated as Z. The chamfered section also mitigates the tendency of blends to deposit.

Figure 14:
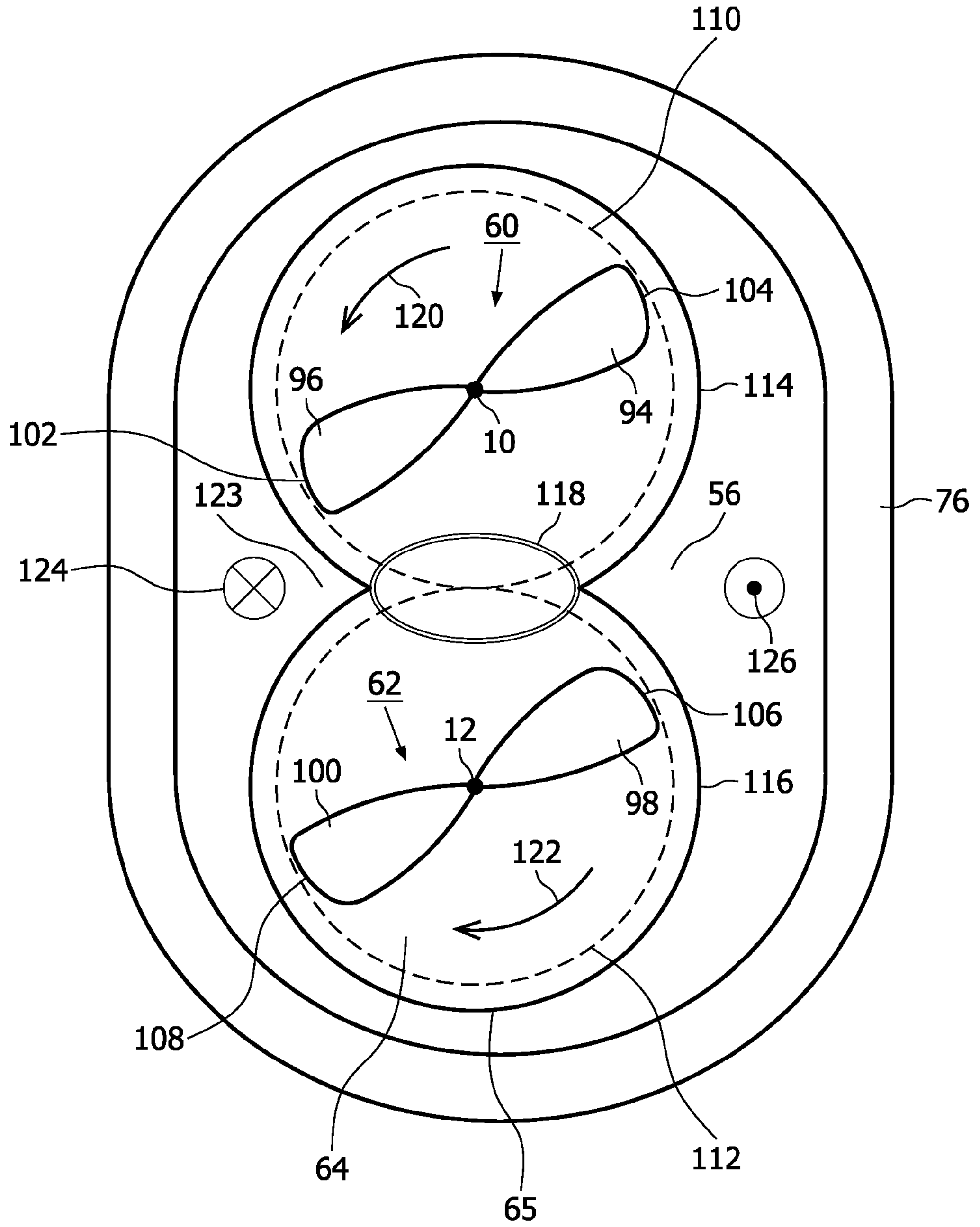
FIG. 14 is a top view on a blender system.

In FIG. 14 a top view on two blade member assemblies 60 and 62 is depicted. Both blade member assemblies 60 and 62 have one or more blades 94, 96, 98 100. Each blade 94, 96, 98 100 has a blade tip 102, 104, 106, 108 at an end which is radially remote from its axis of rotation 10 and 12. The blade member assemblies are arranged in a chamber 64. The chamber has a wall 65. The chamber 64 has the form of two partly overlapping circles, which results to a chamber 64 having the shape of an open figure 8. As the blade tips 102, 104, 106, 108 rotate around their axes of rotation 10 and 12 they describe circular orbits indicated by dashed circles 110 and 112. The chamber 64 has a first wall portion 114 which is arranged conformal and closely around orbit 110. A second wall portion 116 is arranged conformal and closely around orbit 112. The wall portions 114 and 116 cooperate with the tips as they keep the blend within the region of action the tips 102, 104, 106, 108 along most of the perimeter of the tip orbits 110 and 112. The direction of rotation of the blade member assemblies is indicated by arrows 120 and 122. The first and second wall portion 114 and 116 join together thereby forming a flow guide 123 for guiding a blend of ingredients towards the blade member assemblies 60 and 62 under the influence of gravity. Near the flow guide 123 the blend is guided towards the blade member assemblies 60 and 62. The direction of the flow near the flow guide 123 is indicated by an arrow tail 124. Between the blade member assemblies 60 and 80 there exists a region where material is transported from assembly 60 to assembly 62 and vice versa, i.e. there exists a feeding effect between the assemblies. This feeding effect can be used advantageously if the assemblies are at a sufficient proximity of each other. If the assemblies are arranged at sufficient proximity from each other, the regions of actions of both assemblies overlap. The overlapping region or the region of mutual co-operational proximity is indicated by a double lined oval 118. An arrow head 126 indicates the direction of flow at a side of the chamber which is opposite to flow guide 120. Preferably a ramp 56 is positioned here to enable a smooth redirection of the flow as described above.

Figure 15:
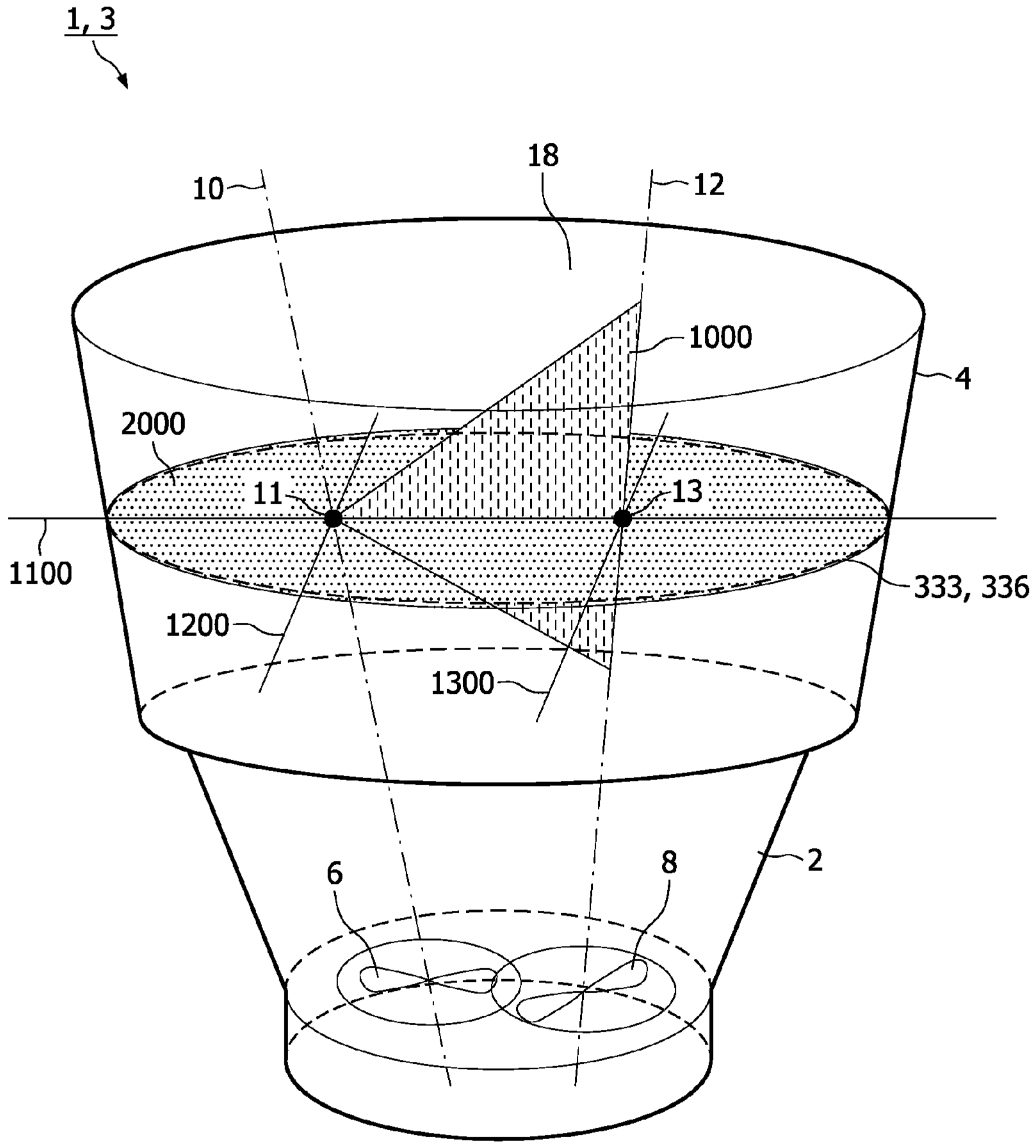
FIG. 15 is an isometric view of a blender system.

In FIG. 15 a blender system 1 according to the invention is depicted. The blender system 1 has a container 3 for holding material to be blended. The container 3 has a first portion 2 which accommodates a first blade member 6 assembly and a second blade member assembly 8. The first blade member assembly 6 is rotationally driveable around a first axis of rotation 10 and the second blade member assembly 8 is rotationally driveable around a second axis of rotation 12. The container 3 has a second portion 4 which is in fluid communication with the first portion 2. Hence, material which is blended can flow from the first portion 2 to the second portion 4 and vice versa. The second portion 4 has a guiding surface 18 for guiding a flow of materials to be blended. A first point of reference 11 is positioned in the second portion 4 and on the first axis of rotation 10. A second point of reference 13 is positioned inside the second portion 4 and on the second axis of rotation 12. A first plane 1000 comprises the first point of reference 11 and the second axis of rotation 12. A second plane 2000 is perpendicular to the first plane 1000 and comprises the first and the second point of reference 11 and 13. The second plane 2000 cross-sects the guiding surface 18. The cross-section 333 of the second plane 2000 and the guiding surface 18 forms and defines a closed guiding curve 336 on the guiding surface 18. A reference axis 1100 which intersects the guiding curve 336 comprises the first and the second point of reference 11 and 13. A first dividing line 1200 comprises the first reference point 11 and intersects the guiding curve 336. The first dividing line 1200 is perpendicular to the reference axis 1100. A second dividing line 1300 comprises the second reference point 13 and intersects the guiding curve 336. The second dividing line 1300 is perpendicular to the reference axis 1100. The guiding curve 336 is of a convex shape and has at least a curved portion 1400 (not shown in FIG. 15 but in FIG. 16) between the first and second dividing line 1200 and 1300.

Figure 16:
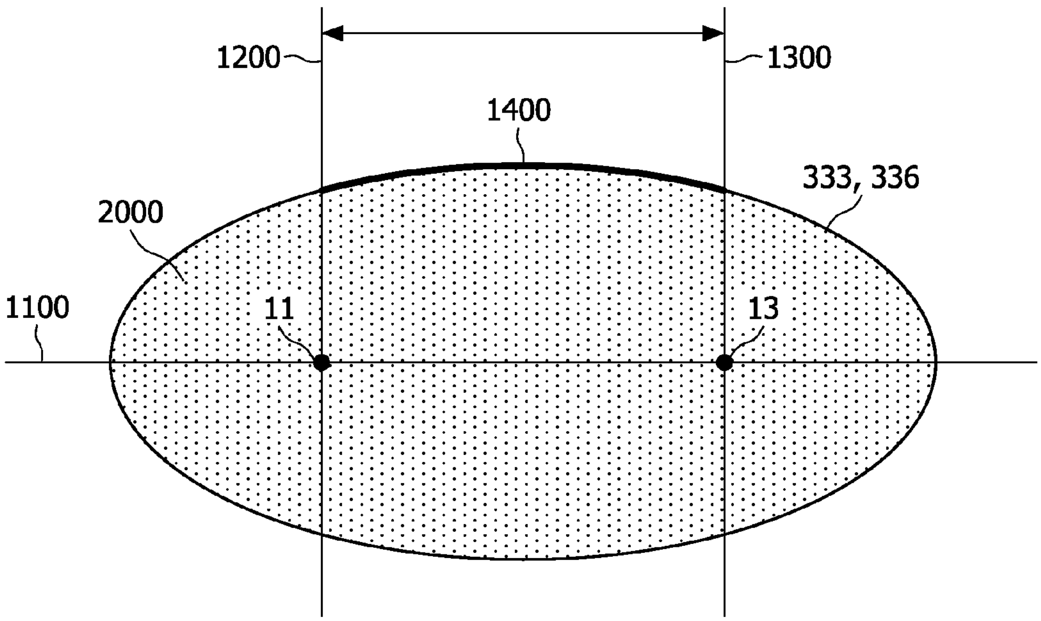
FIG. 16 is a top view of the guiding curve of the blender system of FIG. 15.

In FIG. 16 the second plane as described according to the embodiment of FIG. 15 is shown in top view. Also depicted are the reference axis 1100, the first dividing line 1200 and the second dividing line 1300. The reference axis 1100 and the first dividing line 1200 intersect in the first reference point 11. The reference axis 1100 and the second dividing line 1300 intersect in the second reference point 13. Between the first dividing line 1200 and the second dividing line 1300 the convex curve 336 has a curved portion 1400. The curved portion 1400 is advantageous with respect to noise reduction. The curved portion is also advantageous with respect to proper exchange of blending material between the two vortices which are induced by the rotating blade member assemblies.

Thus an advantageous embodiment of the blender system according to the invention has a container for holding material to be blended, the container having a first portion accommodating a first blade member assembly and a second blade member assembly, which first and second blade member assembly are rotationally driveable around a first and second axis of rotation, respectively, and a second portion in fluid communication with the first portion, wherein the second portion has a guiding surface for guiding the flow, wherein a first point of reference is positioned in the second portion and on the first axis of rotation, wherein a second point of reference is positioned inside the second portion and on the second axis of rotation, wherein a first plane comprises the first point of reference and the second axis of rotation, wherein a second plane which is perpendicular to the first plane, comprises the first and the second point of reference, wherein the a cross-section of the guiding surface and the second plane defines a closed guiding curve on the guiding surface, wherein a reference axis of the guiding curve comprises the first and the second point of reference, wherein a first dividing line comprises the first reference point and intersects the guiding curve, wherein the first dividing line is perpendicular to the reference axis, wherein a second dividing line comprises the second reference point and intersects the guiding curve, wherein the second dividing line is perpendicular to the reference axis, wherein the guiding curve is of a convex shape and has at least a curved portion between the first and second dividing line.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein the circumference of the first portion slightly differs from the mathematical relations as indicated above or wherein the blade member assemblies have more than two blades each. Such other variations to the disclosed embodiments can be understood and effected by those skilled in the art in practicing the claimed invention, from a study of the drawings, the disclosure, and the appended claims.

In the claims, the word “comprising” does not exclude other elements or steps, and the indefinite article “a” or “an” does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A blender system having a container for holding material to be blended, the container having:

a first portion accommodating two or more blade member assemblies for blending said material, wherein the said assemblies are rotationally driveable around respective axes of rotation and a straight line is definable intersecting the convexly shaped curve in a first point and in a second point, wherein the distance between the first and second point exceeds any dimension of the curve in a direction perpendicular to the straight line and each point of the convexly shaped curve has a shortest distance of less than 1 mm to a super-elliptic curve, which super-elliptic curve is definable by a set of points (x,y) for which $$\left|\frac{x}{a}\right|^m + \left|\frac{y}{b}\right|^n = 1;\ m, n > 0;\ a > b > 0,$$

and a second portion for maintaining and guiding a flow of said material through the first portion and along said assemblies, wherein the second portion has a guiding surface for guiding the flow, wherein a cross-section of the guiding surface which encloses said axes of rotation is a convexly shaped closed curve having a tangent of a continuously varying direction along its perimeter for maintaining the flow along said perimeter.

2. The blender system according to claim 1, wherein the two blade member assemblies are rotationally driveable around a first and a second axis of rotation, wherein the straight line is parallel to a further straight line which intersects the first and second axis of rotation.

3. The blender system according to claim 2, wherein the blade member assemblies are accommodated in a chamber formed in the first portion at a bottom side thereof, which chamber collects, during use, the blend of materials, under the action of gravity, whereby said blend is guided into a region of action of the blade member assemblies.

4. The blender system according to claim 3, wherein both blade member assemblies have one or more blades, each blade having a blade tip at an end which is radially remote from its axis of rotation, wherein the chamber has a first and a second wall portion, which first and second wall portions are arranged conformal to the orbits described, during use, by the tips of respective blade member assemblies, to cooperate during use, with said tips.

5. The blender system according to claim 4, wherein the first and second wall portions join together thereby forming a flow guide for guiding a blend of ingredients towards the blade member assemblies under the influence of gravity, wherein the assemblies are arranged in mutual co-operational proximity.

6. The blender system according to claim 5, wherein the first and second wall portions are positioned in an arrangement around the assemblies in a configuration of an open figure 8.

7. The blender system according to claim 6, wherein an inlay forms the arrangement around the assemblies, wherein the inlay has an outer circumference matching with an inside surface of the first container portion.

8. The blender system according to claim 1, wherein the convexly shaped curve is an ellipse.

9. A blender system having a container for holding material to be blended, the container having:

a first portion accommodating two or more blade member assemblies for blending said material, wherein the said assemblies are rotationally driveable around respective axes of rotation and a straight line is definable intersecting a convexly shaped curve in a first point and in a second point, wherein the distance between the first and second point exceeds any dimension of the curve in a direction perpendicular to the straight line and the convexly shaped curve comprises a plurality of straight line segments symmetrically joined by corresponding curved portions, and a second portion for maintaining and guiding a flow of said material through the first portion and along said assemblies, wherein the second portion has a guiding surface for guiding the flow, wherein a cross-section of the guiding surface which encloses said axes of rotation is a convexly shaped closed curve having a tangent of a continuously varying direction along its perimeter for maintaining the flow along said perimeter.

10. A blender system having a container for holding material to be blended, the container having:

a first portion accommodating two or more blade member assemblies for blending said material, wherein the said assemblies are rotationally driveable around respective axes of rotation, and a second portion for maintaining and guiding a flow of said material through the first portion and along said assemblies, wherein the second portion has a guiding surface for guiding the flow, wherein the first and second portion of the container are connected by a surface of a continuously varying curvature and a cross-section of the guiding surface which encloses said axes of rotation is a convexly shaped closed curve having a tangent of a continuously varying direction along its perimeter for maintaining the flow along said perimeter.

* * * * *